Patented Sept. 15, 1925.

1,553,914

UNITED STATES PATENT OFFICE.

JESSE ELIAS RHODES, OF OAKLAND, CALIFORNIA.

PAINT OR PRINTER'S INK SOLVENT AND PROCESS FOR MAKING THE SAME.

No Drawing.   Application filed February 21, 1923. Serial No. 620,489.

*To all whom it may concern:*

Be it known that I, JESSE ELIAS RHODES, a citizen of the United States, and a resident of Oakland, in the county of Alameda and State of California, have invented certain new and useful Improvements in Paint or Printer's Ink Solvents and Processes for Making the Same, of which the following is a specification.

This invention relates to a paint or printer's ink solvent and a process for making the same.

An object of the invention is the provision of a solvent for printer's ink whereby said ink will be diluted and when used in connection with half-tones a clearer and more effective print will be had since the diluted ink may be more evenly distributed over the surface of the type. The printed half-tone produced in this way does not present the disagreeable features, that is, the blurred or muddy picture, that appear from the use of ordinary ink because of the filling up of the half-tones with said ink.

Another object of the invention is the provision of a diluent for printer's ink which, when employed with printer's ink mixed with a small quantity of red-blue or purple ink will produce an effect simulating an embossed or die-stamped printing.

Another object of the invention is the provision of an ink diluent which when employed with the printer's ink will automatically adapt the ink to the stock, irrespective of the atmospheric temperature, and which will maintain the brightness of the colors in the printing.

A still further object of the invention is the provision of a solvent for printer's ink which will require less ink in printing and provide a perfectly working ink for any speed of the press.

Other objects and advantages of the invention will become apparent during the course of the following description.

In carrying out the first step in my process I add rosin to a certain quantity of kerosene and stirring the same occasionally until the keresene will dissolve no more of the rosin. An excess of rosin above that which the kerosene is able to dissolve is added in order to provide sufficient rosin to form a sediment at the bottom of the oil. The solution is complete when a hydrometer placed in the liquid registers approximately 24°. The clear oil-dissolved rosin is drawn off or strained. This solution is made at ordinary temperature.

To form a diluent which is to be used as a printer's ink or paint solvent, I then mix together one part of pale coach varnish, one part of the double silicate of magnesium and nickel and approximately 28 parts of the oil dissolved rosin. This diluent may be employed as a varnish in painting with excellent results. Any well known form of commercial coach varnish now on the market may be employed and which may be formed of African gum copal boiled with clarified oil and then thinned with turpentine.

The double silicate of magnesium and nickel is produced by placing metallic nickel in a flask with commercial nitric acid until the nickel forms nitrate of nickel. In another flask metallic magnesium is covered with water and to which is added nitric acid a little at a time and then more water until a weight of the magnesium equal to the weight of the nickel has been dissolved. The metallic magnesium should be in excess. A large vessel is provided with a dilute solution of water and silicate of sodium (water glass). A very dilute solution of the nitrate of nickel and some of the filtered magnesium solution are added to the sodium silicate. This is stirred well and allowed to remain over-night when the liquid is strained through a cloth. The residue remaining on the cloth is then dried and comprises the double silicate of nickel and magnesium which is employed as noted above.

To the diluent is added a very quick printing ink dryer until the resultant liquid appears quite white, the final liquid having a density, as determined by a hydrometer, of approximately 25°. Any dryer and varnish may be used as may be desired. The density of the varnish and dryer should be such that when employed to form the final liquid as described above that said final liquid will not have a greater density as determined by a hydrometer than 25°.

To produce a substitute for the pale coach varnish in the diluent, I mix together approximately one quart of the double silicate of magnesium and nickel, one pint of boiled linseed oil, about eight quarts of kerosene oil and sufficient rosin to bring the clear liquid to approximately a hydrometer test of 20°. For paints any colored pigment may be stirred into the solution as may be required.

The double silicate of magnesium and nickel aid in causing the kerosene to dissolve more of the rosin and also acts as a dryer in any finished product.

When my ink solvent, is used to thin printer's ink, it will be noted that less ink is required for printing and the original colors are maintained and the ink, when so treated, automatically adapts itself to the stock. Since a very thin ink may be employed for printing and yet get the best results a greater speed of the press will be had. It further may be noted that by the use of my ink solvent a tint block five and a half inches square can be printed on an 8 by 12 inch press.

When the ink solvent is employed with dryers in printer's ink a more opaque printing job in less time will be required since the printing dries very readily, thereby allowing two sides of the work to be printed at one continuous run without lifting the form or waiting for the first side which has been printed to dry.

Cylinder presses, as is well known, require a thicker consistency of ink than is employed in platen presses and where I have described the ink as being especially made thin by the solvent such ink is intended to be employed for platen presses.

The ink solvent is to be used with cylinder presses by making the ink as thin as can be used with the cylinder press ink fountain. To overcome cold, the ink solvent may be applied with a brayer to the ink distribution table or ink fountain roller instead of through the ink fountain.

Black ink where thinned by my solvent may be toned by adding a little red and blue or purple ink whereby an effect is obtained which simulates an embossed or die-stamped printing.

In printing half-tones on machine finished book or coated stock without "make ready" an impression is taken on the tympan of the press after which the tympan is dusted with corn starch, talcum or French chalk to fill up the unevenness of the tympan sheet and then the ink is run on the press with as little ink as will print bright colors and which will not permit white spots of paper to show through the solid. The ink, before being applied to the press, is thinned by my solvent until the ink drips from an ink knife like water. Two sides of the sheet may be printed immediately and when found necessary the tympan may be dusted occasionally with any one of the powders noted above.

The ink so treated will not "pick" or dry quickly on the press since the solvent prevents "picking."

What I claim is:

1. An ink or paint solvent comprising rosin dissolved in kerosene to saturation, a double silicate of magnesium and nickel and coach varnish.

2. An ink or paint solvent comprising kerosene, rosin, varnish and a double silicate of magnesium and nickel.

3. An ink and paint solvent comprising 28 parts of a solution of kerosene and rosin, one part of pale coach varnish and one part of a double silicate of magnesium and nickel.

4. An ink and paint solvent comprising 28 parts of kerosene oil in which has been dissolved rosin to saturation, one part of pale coach varnish, and one part of double silicate of magnesium and nickel.

5. An ink and paint solvent comprising 28 parts of kerosene oil in which has been dissolved rosin to saturation, one part of pale coach varnish, one part of double silicate of magnesium and nickel and sufficient printing ink dryer until the liquid approximates a density of 25° Baumé.

6. A process for the manufacture of an ink or paint solvent which comprises stirring rosin into kerosene oil to saturation, and adding a double silicate of magnesium and nickel and a varnish.

JESSE ELIAS RHODES.